US012110042B1

(12) United States Patent
Hoang et al.

(10) Patent No.: US 12,110,042 B1
(45) Date of Patent: Oct. 8, 2024

(54) SYSTEMS AND METHODS FOR GENERATING PHYSICALLY REALISTIC TRAJECTORIES

(71) Applicant: Aurora Operations, Inc., Pittsburgh, PA (US)

(72) Inventors: Anh Tuan Hoang, Jersey City, NJ (US); Harshayu Girase, Union City, CA (US); Sai Bhargav Yalamanchi, Mountain View, CA (US); Micol Marchetti-Bowick, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 322 days.

(21) Appl. No.: 17/501,480

(22) Filed: Oct. 14, 2021

Related U.S. Application Data

(60) Provisional application No. 63/091,404, filed on Oct. 14, 2020.

(51) Int. Cl.
*B60W 60/00* (2020.01)
*B60W 40/04* (2006.01)
*B60W 50/00* (2006.01)
*B60W 50/06* (2006.01)
*G06N 3/044* (2023.01)
*G06N 3/045* (2023.01)

(52) U.S. Cl.
CPC ...... *B60W 60/00274* (2020.02); *B60W 40/04* (2013.01); *B60W 50/0097* (2013.01); *B60W 50/06* (2013.01); *B60W 60/0011* (2020.02); *G06N 3/044* (2023.01); *G06N 3/045* (2023.01); *B60W 2554/4041* (2020.02); *B60W 2554/4044* (2020.02)

(58) Field of Classification Search
CPC ....... B60W 60/00274; B60W 60/0011; B60W 40/04; B60W 50/0097; B60W 50/06; B60W 2554/4041; B60W 2554/4044; G06N 3/045; G06N 3/044
See application file for complete search history.

(56) References Cited

U.S. PATENT DOCUMENTS

| 10,733,506 | B1 * | 8/2020 | Ogale | G06N 3/084 |
| 11,458,987 | B2 * | 10/2022 | Li | G06N 3/044 |
| 11,577,741 | B1 * | 2/2023 | Reschka | B60W 50/045 |
| 2019/0147610 | A1 * | 5/2019 | Frossard | G06N 3/045 |
| | | | | 382/103 |

(Continued)

OTHER PUBLICATIONS

Bansal et al, "Chauffeurnet: Learning to Drive by Imitating the Best and Synthesizing the Worst", arXiv:1812.03079v1, Dec. 7, 2018, 20 pages.

(Continued)

*Primary Examiner* — Fadey S. Jabr
*Assistant Examiner* — Naeem Taslim Alam
(74) *Attorney, Agent, or Firm* — Dority & Manning, P.A.

(57) ABSTRACT

Example aspects of the present disclosure describe the generation of more realistic trajectories for a moving actor with a hybrid technique using an algorithmic trajectory shaper in a machine-learned trajectory prediction pipeline. In this manner, for example, systems and methods of the present disclosure leverage the predictive power of machine-learning approaches combined with a priori knowledge about physically realistic trajectories for a given actor as encoded in an algorithmic approach.

20 Claims, 10 Drawing Sheets

(56) References Cited

U.S. PATENT DOCUMENTS

| | | | | |
|---|---|---|---|---|
| 2020/0353832 | A1* | 11/2020 | Xiao | G06N 3/044 |
| 2021/0229657 | A1* | 7/2021 | Herman | B60W 30/0956 |
| 2022/0063662 | A1* | 3/2022 | Sprunk | G06V 20/58 |
| 2024/0025449 | A1* | 1/2024 | Wulfe | B60W 60/0011 |

OTHER PUBLICATIONS

Bansal et al, "Combining Optimal Control and Learning for Visual Navigation in Novel Environment", arXiv:1903.02531v2, Jul. 17, 2019, 18 pages.

Caesar et al, "NuScenes: A Multimodal Dataset for Autonomous Driving", arXiv:1903.11027v5, May 5, 2020, 16 pages.

Casas et al, "SpAGNN: Spatially-Aware Graph Neural Networks for Relational Behavior Forecasting from Sensor Data", arXiv:1910.08233v1, Oct. 18, 2019, 11 pages.

Chai et al, "MultiPath: Multiple Probabilistic Anchor Trajectory Hypotheses for Behavior Prediction", arXiv:1910.05449v1, Oct. 12, 2019, 14 pages.

Chen, "Kalman Filter for Robot Vision: A Survey", Industrial Electronics, vol. 59, No. 11, Nov. 2012, pp. 4409-4420.

Djuric et al, "Uncertainty-Aware Short-Term Motion Prediction of Traffic Actors for Autonomous Driving". arXiv:1808.05819v3, Mar. 4, 2020, 10 pages.

Fowler, "Refactoring: Improving the Design of Existing Code", Conference on Extreme Programming and Agile Methods, Aug. 2002, Chicago, Illinois, United States, 1 page.

Howard et al, "Receding Horizon Model-Predictive Control for Mobile Robot Navigation of Intricate Paths", Fields and Service Robotics, pp. 67-78, 2010.

Huang et al, "STGAT: Modeling Spatial-Temporal Interactions for Human Trajectory Prediction", International Conference on Computer Vision, Oct. 27-Nov. 2, 2019, Seoul, Korea, pp. 6272-6281.

Kalman, "A New Approach to Linear Filtering and Prediction Problems", Journal of Basic Engineering, Mar. 1960, pp. 35-45.

Kim et al, "Probabilistic Vehicle Trajectory Prediction over Occupancy Grid Map via Recurrent Neural Network", arXiv:1704.07049v2, Sep. 1, 2017, 6 pages.

Kong et al, "Kinematic and Dynamic Vehicle Models for Autonomous Driving Control Design", Intelligent Vehicles Symposium, Jun. 28-Jul. 1, 2015, Seoul, Korea, pp. 1094-1099.

Kumar et al, "Interaction-Based Trajectory Prediction Over a Hybrid Traffic Graph", arXiv:2009.12916v1, Sep. 27, 2020, 12 pages.

Lee et al, "DESIRE: Distant Future Prediction in Dynamic Scenes with Interacting Agents", arXiv:1704.04394v1, Apr. 14, 2017, 10 pages.

Lee et al, "Joint Interaction and Trajectory Prediction for Autonomous Driving using Graph Neural Networks", arXiv:1912.07882v1, Dec. 17, 2019, 9 pages.

Ma et al, "Trafficpredict: Trajectory Prediction for Heterogencous Traffic-Agents", Conference on Artificial Intelligence, Jan. 27-Feb. 1, 2019, Honolulu, Hawaii, United States, pp. 6120-6127.

Mangalam et al, "It is Not the Journey but the Destination: Endpoint Condition Trajectory Prediction", arXiv:2004.02025v3, Jul. 18. 2020, 19 pages.

Mohamed et al, "Social-StGCNN: A Social Spatio-Temporal Graph Convolutional Neural Network for Human Trajectory Prediction", Conference on Computer Vision and Pattern Recognition, Jun. 14-19, 2020, Virtual, pp. 14424-14432.

Phan-Minh et al, "CoverNet: Multimodal Behavior Prediction using Trajectory Sets", Conference on Computer Vision and Pattern Recognition, Jun. 14-19, 2020, Virtual, pp. 14074-14083.

Rhinehart et al, "Precog: Prediction Conditioned on Goals in Visual Multi-Agent Settings", arXiv:1905.01296v3, Sep. 30, 2019, 24 pages.

Scarselli et al, "The Graph Neural Network Model", Transactions on Neural Networks, vol. 20, No. 1, Jan. 2009, pp. 61-80.

Schreier et al, "An Integrated Approach to Maneuver-Based Trajectory Prediction and Criticality Assessment in Arbitrary Road Environments", Transactions on Intelligent Transportation Systems, Oct. 2016, 16 pages.

Sculley et al, "Machine Learning: The High Interest Credit Card of Technical Debt", Software Engineering for Machine Learning, 2014, 9 pages.

Sontag, "Mathematical Control Theory: Deterministic Finite Dimensional Systems", Transactions Automatic Control, 4 pages.

Streubel et al, "Prediction of Driver Intended Path at Intersections", Intelligent Vehicles Symposium, Jun. 8-11, 2014, Dearborn, Michigan, United States, pp. 134-139.

Sutskever et al, "Sequence to Sequence Learning with Neural Networks", arXiv:1409.3215v3, Dec. 14, 2014, 9 pages.

Wang et al, "Gaussian Process Dynamical Models for Human Motion", Transactions on Pattern Analysis and Machine Learning, vol. 30, No. 2, Feb. 2008, pp. 283-299.

Watters et al, "Visual Interaction Networks: Learning a Physics Simulator from Video", Conference on Neural Information Processing Systems, Dec. 4-9, 2017, Long Beach, California, United States, 9 pages.

Yao et al, "Control Strategies on Path Tracking for Autonomous Vehicles: State of the Art and Future Challenges", Rapid Review, Open Access Journal, Sep. 15, 2020, pp. 161211-161222.

Zhang et al, "Stochastic Trajectory Prediction with Social Graph Network", arXiv:1907.10233v1, Jul. 24. 2019, 10 pages.

Zhao et al., "TNT: Target-Driven Trajectory Predictions", arXiv:2008.08294v2, Aug. 21, 2020, 12 pages.

Coulter, "Implementation of the Pure Pursuit Path Tracking Algorithm", Technical Report, Carnegie-Mellon University of Pittsburgh Robotics Institute, Jan. 1992, 11 pages.

Cui et al., "Deep Kinematic Models for Kinematically Feasible Vehicle Trajectory Predictions", arXiv:1908.00219v3, 7 pages.

Cui et al., "Multimodal Trajectory Predictions for Autonomous Driving using Deep Convolutional Networks", arXiv:1809.10732v2, 7 pages.

Zhang et al., "Map-Adaptive Goal-Based Trajectory Prediction", arXiv:2009.04450v2, 13 pages.

* cited by examiner

SYSTEMS AND METHODS FOR GENERATING PHYSICALLY REALISTIC TRAJECTORIES

RELATED APPLICATION

The present application is based on and claims the benefit of U.S. Provisional Patent Application No. 63/091,404, filed Oct. 14, 2020, which is incorporated by reference herein.

BACKGROUND

Autonomous platforms, including autonomous vehicles, can receive data that is used to perceive an environment through which the platform can travel. Autonomous platforms can use machine-learned models to generate trajectories for various actors (e.g., the platform itself, objects within the environment, etc.). The effective operation of an autonomous platform may depend on accurate generation of trajectories for navigating through the environment and around any objects or other obstacles.

SUMMARY

Aspects and advantages of embodiments of the present disclosure will be set forth in the following description. The present disclosure describes the generation of trajectories for a moving actor with improved physical realism using a hybrid technique including an algorithmic trajectory shaper in a machine-learned trajectory prediction pipeline. In this manner, for example, systems and methods of the present disclosure leverage the predictive power of machine-learning approaches combined with a priori knowledge about physically realistic trajectories for a given actor as encoded in an algorithmic approach. For example, a machine-learned model may be used to predict "where" a moving actor is headed in an environment (e.g., a goal), while algorithms that implicitly or explicitly encode physically meaningful characteristics of the actor may be used to determine "how" the actor might traverse the environment to reach the goal.

For instance, in some example embodiments, systems and methods according to aspects of the present disclosure generate predicted trajectories for objects moving in the surrounding environment of an autonomous platform, such as an autonomous vehicle. The autonomous vehicle can obtain sensor data associated with its surrounding environment. The autonomous vehicle can process the sensor data to obtain data indicative of an object (e.g., pedestrian, vehicle, etc.) within the surrounding environment of the autonomous vehicle. In some embodiments, this data describes, for example, the past and current states of the object (e.g., position, heading, velocity, acceleration, etc.). To better predict the future motion of the object, the autonomous vehicle can use a hybrid technique leveraging machine-learned model(s) and an object path tracking algorithm (e.g., a rules-based algorithm, optionally constructed with physically meaningful constraints and/or parameters). The hybrid technique can allow the autonomous vehicle to determine more accurate trajectories while also better accommodating, for example, physical characteristics of the object (e.g., physical constraints or behaviors, kinematics, dynamics, etc.).

In one example, an example autonomous vehicle determines a set of motion goal paths for an object and uses a trained graph neural network to generate a graph based at least in part on the set of motion goal paths. The example autonomous vehicle generates acceleration profiles for the various motion goal paths of the graph and uses a path tracking algorithm to determine predicted motion trajectories of the object based the acceleration profiles. The predicted motion trajectories can include spatial-temporal trajectories that describe the future positions of the object within the environment across a plurality of future timesteps. In this manner, for example, the technology of the present disclosure can leverage the respective strengths of a learning based approach with a structured algorithmic technique (e.g., a path tracking algorithm) to improve the physical realism of the predicted trajectories, the maintainability and interpretability of the prediction/forecasting function, as well as overall computational efficiency.

Example systems and methods according to aspects of the present disclosure provide various technical effects and benefits. For instance, the improved trajectory generation techniques introduced in the present disclosure can provide for autonomous platforms (e.g., autonomous vehicles) to use available data to more capably understand, anticipate, and interact with their environment(s). Example autonomous vehicles, for instance, can predict with improved realism the motion of moving objects in their environment (e.g., traffic, pedestrians, etc.), enabling better control, more timely and more accurate reaction and interaction, smoother handling (e.g., by better predicting and avoiding potential obstructions), etc.

Example systems and methods according to aspects of the present disclosure offer various improvements over prior approaches to trajectory prediction. For instance, some prior approaches rely on models with few or no physically meaningful and/or interpretable parameters or structures, risking a high cost (e.g., time, computational cost, etc.) to maintain, upgrade, and/or replace the models over time. In contrast, example systems and methods according to aspects of the present disclosure provide for interpretable and modular model design by incorporating algorithmic techniques in the trajectory prediction pipeline. Another example improvement includes increased sample efficiency. In the example context of autonomous vehicles, it can be expensive to collect a large amount of real-world driving data (e.g., and more so if high-definition maps are required). Unlike past methods, in which pure machine-learned models often must learn abstracted physical correlations (e.g., physics, dynamics, etc.) from scratch, example systems and methods according to the present disclosure using physics-based algorithms can inject a priori, distilled knowledge about a real-world environment and actors moving within it (e.g., implicitly and/or explicitly). Therefore, a given target performance level may be achieved by example systems and methods according to the present disclosure at lower expense (e.g., temporal, fiscal, and/or computational expense). For example, in some implementations, systems and methods of the present disclosure can provide improved accuracy over existing approaches using half the training data. Another example improvement includes an extended prediction horizon in some implementations. For instance, the intrinsic structure and embedded physical basis of algorithmic techniques can support longer-term projections in some implementations, providing for extended prediction horizons and thus, more lead time to process expected events (e.g., obstacles, accidents, etc.).

As an example, in an aspect, the present disclosure provides an example computer-implemented method. The example method includes obtaining data indicative of an object within an environment of an autonomous vehicle. The example method includes determining, using one or more machine-learned models, a plurality of motion goal paths for the object based at least in part on the data indicative of the object within the environment of the autonomous vehicle. In the example method, a respective motion goal path includes a plurality of waypoints for the object. The example method includes determining a plurality of acceleration profiles based on the plurality of motion goal paths for the object. The example method includes determining, using a path tracking algorithm, a plurality of predicted motion trajectories of the object based on the plurality of acceleration profiles. In the example method, a respective predicted motion trajectory of the object includes a spatial-temporal trajectory that comprises a plurality of future predicted positions of the object at a plurality of respective future timesteps.

In some implementations of the example method, the data indicative of the object within the environment of the vehicle includes: (i) data indicative of one or more previous positions of the object and (ii) state data indicative of a heading of the object, a current position of the object, a velocity of the object, and an acceleration of the object.

In some implementations of the example method, the one or more machine-learned models include a graph neural network, and determining the plurality of motion goal paths includes generating, using the graph neural network, a graph for the object based on the plurality of motion goal paths. In some implementations of the example method, the graph is encoded with: (i) a plurality of goal nodes associated with the plurality of motion goal paths and (ii) an object node associated with a current state and a past state of the object.

In some implementations of the example method, the one or more machine-learned models includes one or more convolutional neural networks and a recurrent neural network. In some implementations of the example method, the plurality of goal nodes are encoded using the one or more convolutional neural networks and the object node is encoded using the recurrent neural network.

In some implementations of the example method, determining a plurality of acceleration profiles includes generating, using one or more machine-learned temporal prediction models, multiple acceleration profiles for each of the plurality of motion goal paths.

In some implementations of the example method, the example method includes obtaining map information associated with the environment of the autonomous vehicle. In some implementations of the example method, the plurality of motion goal paths includes: (i) at least one map-based goal that is based on the map information associated with the environment of the vehicle and (ii) at least one map-free goal that is based on a heading of the object.

In some implementations of the example method, determining the plurality of predicted motion trajectories includes identifying a motion goal path of the plurality of motion goal paths for the object, determining a goal point on the motion goal path and a control point for the object, and determining a curvature of a predicted motion trajectory based on the goal point, the control point for the object, and an object dynamics constraint associated with a possible curvature that is executable by the object. In some implementations of the example method, determining the plurality of predicted motion trajectories includes updating a state of the object based on at least one of the plurality of acceleration profiles.

In some implementations of the example method, the one or more machine-learned models are trained in an end-to-end manner based on a total loss including a mode classification loss and a trajectory error loss. In some implementations of the example method, the mode classification loss corresponds to one or more probabilities determined for the plurality of predicted motion trajectories, and the trajectory error loss corresponds to one or more distance metrics determined for the plurality of predicted motion trajectories.

In some implementations of the example method, the example method includes evaluating the predicted motion trajectories based on at least one of: (i) a lateral speed violation threshold, (ii) a centripetal acceleration violation threshold, or (iii) a traversal acceleration violation threshold.

In some implementations of the example method, the example method includes determining a motion plan of the autonomous vehicle based on at least one of the predicted motion trajectories of the object, and the motion plan is indicative of a motion trajectory of the autonomous vehicle.

In some implementations of the example method, the example method includes initiating a motion control of the autonomous vehicle based on the motion plan.

In some implementations of the example method, the autonomous vehicle is an autonomous truck.

As another example, in an aspect, the present disclosure provides an example autonomous vehicle control system. The example system includes one or more processors and one or more computer-readable media. The media store instructions that, when executed by the one or more processors, cause the autonomous vehicle control system to perform operations. The operations include obtaining data indicative of an object within an environment of an autonomous vehicle. The operations include obtaining map information associated with the environment of the autonomous vehicle. The operations include determining, using one or more machine-learned models, a plurality of motion goal paths for the object based at least in part on the data indicative of the object within the environment of the autonomous vehicle and the map information associated with the environment of the autonomous vehicle. The operations include determining a plurality of acceleration profiles based on the plurality of motion goal paths for the object. The operations include determining, using a path tracking algorithm, a plurality of predicted motion trajectories of the object based on the plurality of acceleration profiles. In the example system, a respective predicted motion trajectory of the object includes a spatial-temporal trajectory that includes a plurality of future predicted positions of the objects at a plurality of respective future timesteps.

In some implementations of the example system, the one or more machine-learned models include a graph neural network, a convolutional neural network, and a recurrent neural network.

In some implementations of the example system, determining a plurality of acceleration profiles includes generating, using one or more machine-learned temporal prediction models, multiple acceleration profiles for each of the plurality of motion goal paths.

In some implementations of the example system, determining the plurality of motion goal paths includes encoding, using the one or more machine-learned models, a graph for the object based on the plurality of motion goal paths.

In some implementations of the example system, determining the plurality of predicted motion trajectories includes identifying a motion goal path of the plurality of motion goal paths for the object, determining a goal point on the motion goal path and a control point for the object, and determining a curvature of a predicted motion trajectory based on the goal point, the control point for the object, and an object dynamics constraint associated with a possible curvature that is executable by the object.

In some implementations of the example system, the operations include determining a motion plan of the autonomous vehicle based on at least one of the predicted motion trajectories of the object. In some implementations of the example system, the motion plan is indicative of a motion trajectory of the autonomous vehicle.

As another example, in an aspect, the present disclosure provides for an example autonomous vehicle that includes one or more processors and one or more computer-readable media. The media store instructions that, when executed by the one or more processors, cause the autonomous vehicle to perform operations. The operations include obtaining data indicative of an object within an environment of the autonomous vehicle. The operations include determining, using one or more machine-learned models, a plurality of motion goal paths for the object based at least in part on the data indicative of the object within the environment of the autonomous vehicle. The operations include determining, using a path tracking algorithm, a plurality of predicted motion trajectories of the object based on the plurality of motion goal paths. In the example vehicle, a respective predicted motion trajectory of the object comprises a spatial-temporal trajectory that comprises a plurality of future predicted positions of the objects at a plurality of respective future timesteps. The operations further include controlling the autonomous vehicle based on the predicted motion trajectories of the object.

In some implementations of the example vehicle, the example vehicle includes one or more sensors configured to collect sensor data associated with the environment of the autonomous vehicle. In some implementations of the example vehicle, the data indicative of the object within the environment of the autonomous vehicle is based on the sensor data.

In some implementations of the example vehicle, determining the plurality of predicted motion trajectories includes determining a plurality of acceleration profiles based on the plurality of motion goal paths for the object and determining, using the path tracking algorithm, the plurality of predicted motion trajectories of the object based on the plurality of acceleration profiles.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented within other autonomous platforms and other computing systems.

Figure 1:
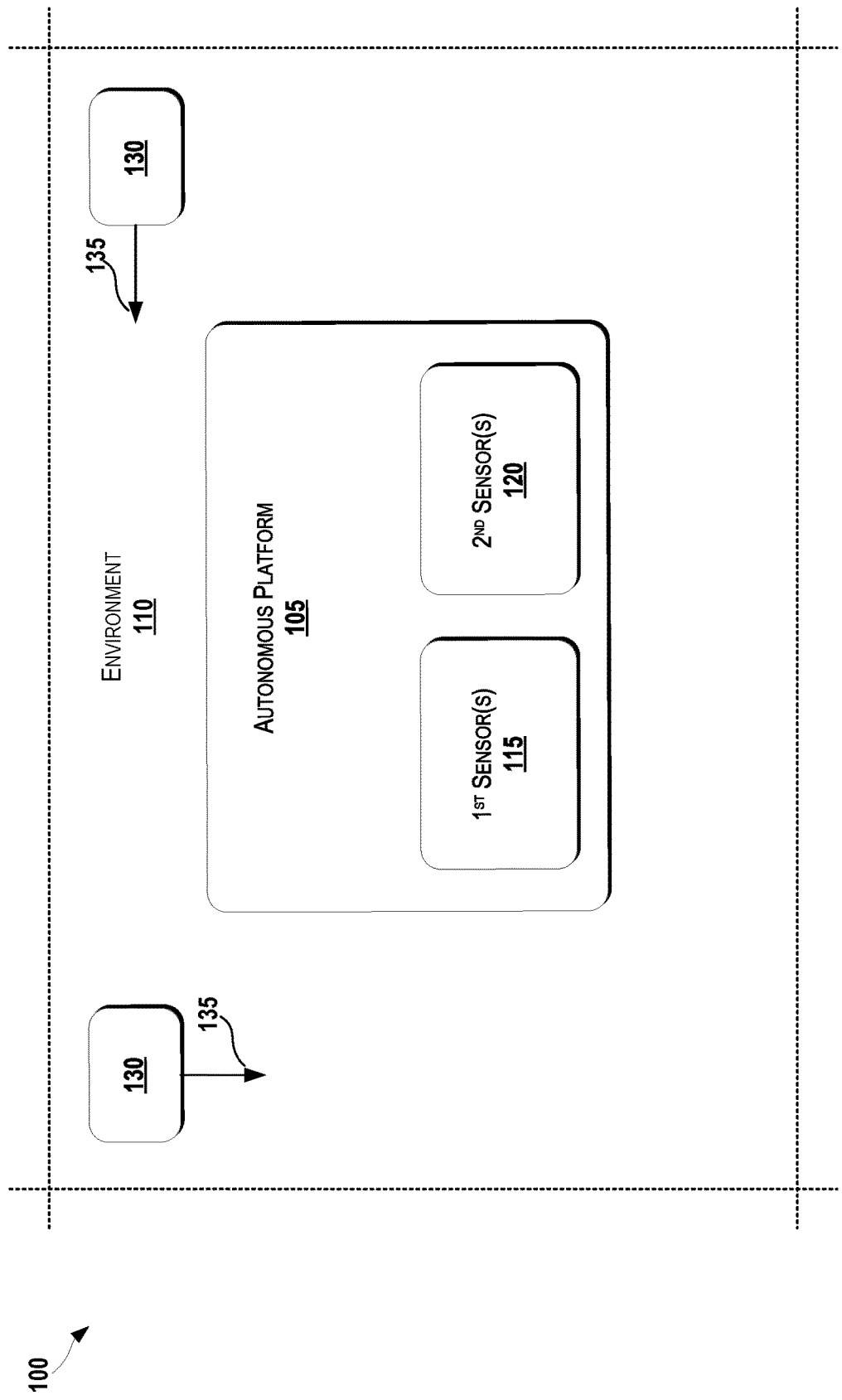
FIG. 1 is a block diagram of an operational scenario, according to some implementations of the present disclosure.

With reference now to FIGS. 1-11, example embodiments of the present disclosure will be discussed in further detail. FIG. 1 depicts a block diagram of an example operational scenario 100 according to example implementations of the present disclosure. The operational scenario 100 includes an autonomous platform 105 and an environment 110. The environment 110 can be external to the autonomous platform 105. The autonomous platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. Although trajectories 135 are depicted as emanating from dynamic object(s) 130, it is also to be understood that relative motion within the environment 110 can include one or more trajectories of the autonomous platform 105 itself. For instance, aspects of the present disclosure relate to the generation of trajectories, which can in various implementations include trajectories 135 of the dynamic object(s) 130 and/or one or more trajectories of the autonomous platform 105 itself.

The autonomous platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck, including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
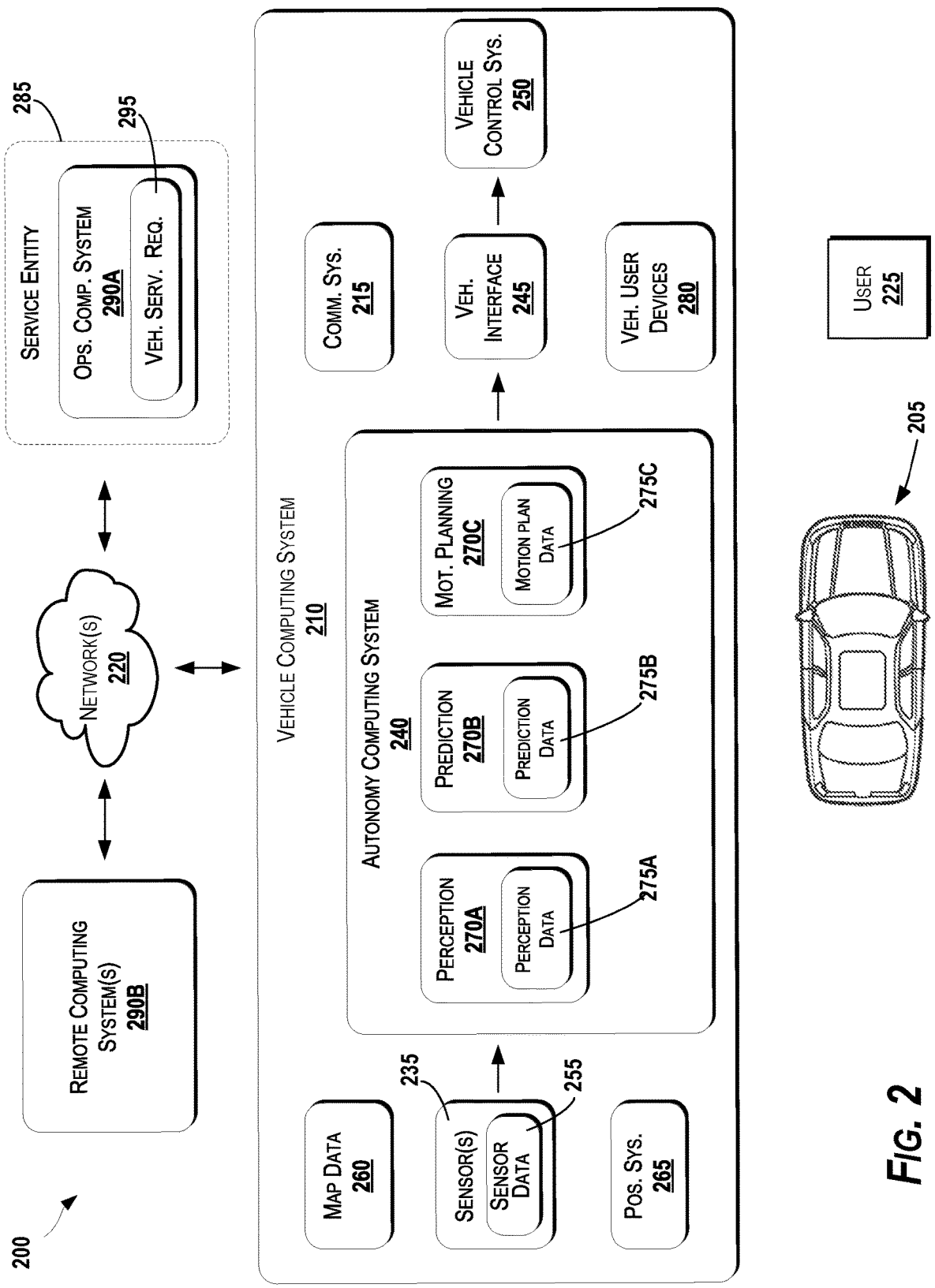
FIG. 2 is a block diagram of a system, according to some implementations of the present disclosure.

FIG. 2 depicts an example system overview 200 of the autonomous platform as an autonomous vehicle according to example implementations of the present disclosure. More particularly, FIG. 2 illustrates a vehicle 205 including various systems and devices configured to control the operation of the vehicle 205. For example, the vehicle 205 can include an on-board vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein. Generally, the vehicle computing system 210 can obtain sensor data 255 from a sensor system 235 (e.g., sensor(s) 115, 120 of FIG. 1, etc.) on-board the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory on-board the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set on-board or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located on-board the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located on-board the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data, performing autonomy functions, predicting object trajectories, generating vehicle motion trajectories, controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The on-board systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred and sixty degree view of the surrounding environment. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred and sixty degree view of a surrounding environment of the autonomous vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain multi-modal sensor data indicative of one or more static or dynamic objects within an environment of the autonomous vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects/actors (e.g., in motion or likely to be in motion, etc.) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction/forecasting 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270C, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms and one or more machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The way point(s) can be future locations for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., waypoints/locations(s) over the next several seconds, etc.). Moreover, a motion plan may include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store on-board the vehicle 205 to another vehicle.

The vehicle computing system 210 can include the one or more vehicle user devices 280. For example, the vehicle computing system 210 can include one or more user devices with one or more display devices located on-board the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or on-board the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s).

Figure 3:
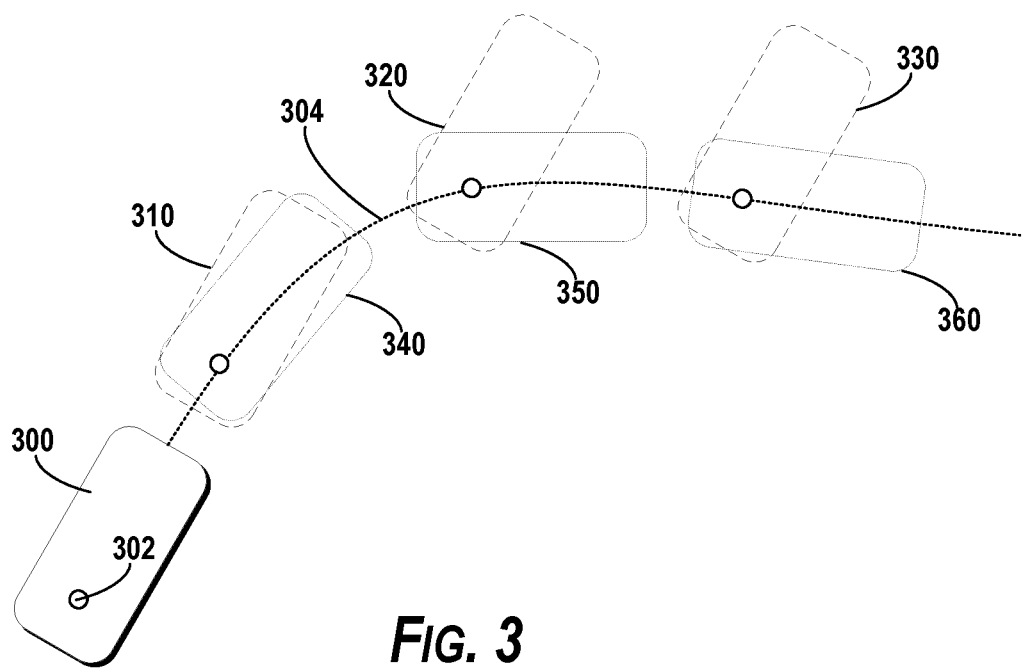
FIG. 3 illustrates a trajectory comparison according to some implementations of the present disclosure.
Figure 4:
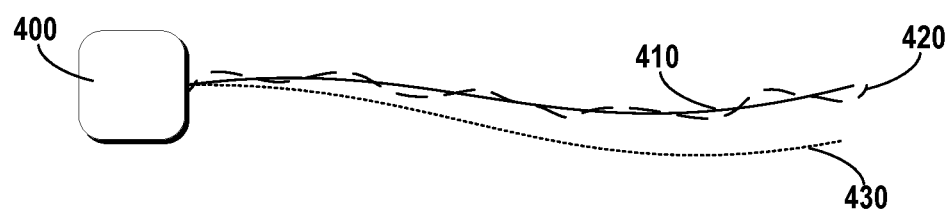
FIG. 4 illustrates a trajectory comparison according to some implementations of the present disclosure.

To help improve the performance of an autonomous platform, such as an autonomous vehicle of FIG. 2, the technology of the present disclosure can provide for the generation of trajectories for a moving actor with improved realism. In some aspects, realism can refer to behavior corresponding or conforming to expectations (e.g., intuitive expectations, statistical expectations, etc.) based on theoretical and/or experiential understandings of how the actor typically moves through space (e.g., in and/or through an environment, such as environment 110). For example, FIG. 3 is an illustration of a moving actor 300 having a reference point 302 (e.g., an autonomous platform, a vehicle, a pedestrian, any moving object, etc.) that is traveling along path 304, with projected future-time positions 310, 320, and 330. If the sole measure of predicted path-following performance is based on the predicted motion of the control point 302, then the illustrated future-time positions 310, 320, and 330 may be considered in some cases to be a good result. However, the result may not be feasible depending on the physical capabilities of the moving actor 300. For instance, the moving actor 300 may be unable to laterally traverse the path 304 as illustrated between future-time positions 320 and 330. In this manner, for example, a trajectory including future-time positions 310, 320, and 330 may not be considered realistic for the moving actor 300. In contrast, in one illustrated example, a trajectory including future-time positions 340, 350, and 360 (e.g., as generated according to example aspects of the present disclosure) may be considered more realistic for the moving actor 300. Similarly, for example, FIG. 4 illustrates a moving actor 400 tasked with traversing a path 410. Although potential trajectory 420 may, in some respects, provide for a lower distance error as compared to potential trajectory 430, potential trajectory 430 (e.g., as generated according to example aspects of the present disclosure) may offer in some respects a more realistic result due to, for example, characteristics of moving actor 400 that would render the undulations of trajectory 420 impracticable (e.g., kinematic, dynamic, or other characteristics, including physical or preferential limits on, e.g., acceleration).

A moving actor can be substantially any object in an environment (e.g., environment 110) that is moving or may be moving. For example, a moving actor can be an autonomous platform (e.g., autonomous platform 105), and/or one or more objects or actors in the vicinity of the autonomous platform or otherwise within a detectable range. For instance, the technology of the present disclosure may be used to generate trajectories for one or more objects or other actors around an autonomous platform, and the technology of the present disclosure may also be used to generate (e.g., as part of a processing pipeline) trajectories for the autonomous platform itself.

Figure 5:
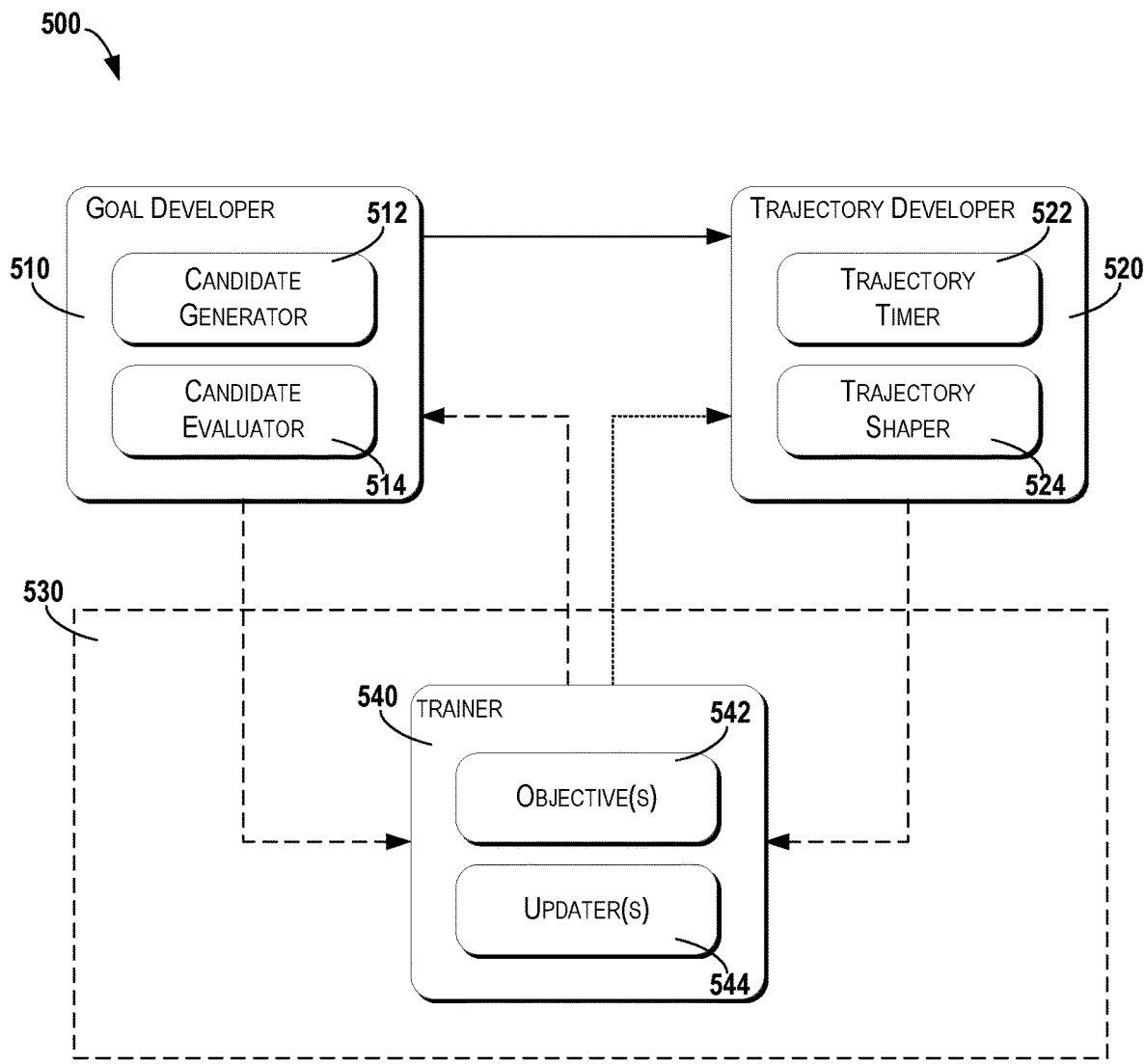
FIG. 5 is an example of a trajectory generation system according to some implementations of the present disclosure.

In some implementations, an example system 500 according to aspects of the present disclosure is implemented as illustrated in FIG. 5. A goal (e.g., a positional goal, such as a targeted location in space) can be determined at least part using a goal developer 510. The goal developer 510 can, for example, include a candidate generator component 512 to determine one or more candidate motion goal paths for one or more moving actors to follow. In some implementations, the example system 500 can generate trajectories for a plurality of moving actors.

A motion goal path can include a spatial mode of traveling through an environment. For example, a motion goal path can include a path along which a moving actor is expected to move. For instance, a motion goal path for a vehicle moving through an intersection of a roadway can include a path proceeding straight through the intersection and/or paths turning onto the intersecting roadway. A motion goal path can be different than a trajectory in some implementations. For instance, a motion goal path can correspond to where a moving actor should or might generally be expected to travel based on available information (e.g., within a lane of a roadway, for a vehicle, or within a crosswalk, for a pedestrian, etc.), but the actual trajectory of the moving actor may differ (e.g., the moving actor may leave the lane, or may weave within the lane, etc.). In some aspects, a motion goal path can be considered in some implementations to include a high-level estimation of where a moving actor might travel to achieve a goal (e.g., to cross the street). Accordingly, a trajectory may then be generated for the moving actor to provide more specific and/or definite information (e.g., with higher confidence and/or precision) about the future motion of the moving actor.

In some implementations, determining the motion goal paths can include, for instance, generating waypoints along the motion goal path, or generating other representations of the motion goal path (e.g., representations from which or by which the motion goal path(s) may be generated or identified, such as a vector representation or analytical representation). In some implementations, motion goal paths may be generated in a global reference frame. In some implementations, motion goal paths may be generated and/or transformed in an arbitrarily positioned reference frame. In some implementations, motion goal paths may be generated and/or transformed in a reference frame anchored to the moving actor itself (e.g., at a control point).

The goal developer 510 can use any one or more resources of a vehicle computing system to determine the candidate motion goal paths (e.g., one or more resources such as map data 260, sensor(s) 235, sensor data 255, perception data 275A, etc.). For instance, in some implementations, state data is used by one or more components of the example system 500, such as state data indicating any one or more of: position data for the moving actor (e.g., present position, past position(s), etc.), heading data for the moving actor (e.g., past and/or present direction(s) of movement, data indicating an orientation of the moving actor, etc.), and motion data (e.g., past and/or present velocity, acceleration, jerk, etc.).

In some implementations, a goal developer (e.g., goal developer 510) and/or a trajectory developer (e.g., trajectory developer 520) can include one or more machine-learned models. Example machine-learned models include neural networks or other non-linear models (e.g., multi-layer models). Example neural networks include feed forward neural networks, deep neural networks, recurrent neural networks, convolutional neural networks, graph neural networks, and combinations thereof. Some example machine-learned models can leverage an attention mechanism such as self-attention. For example, some example machine-learned models can include multi-headed self-attention models (e.g., transformer models).

For example, in some implementations, a goal developer (e.g., goal developer 510) is configured to generate a graph of candidate motion goal paths for a moving actor. For instance, a goal developer can generate multiple candidate motion goal paths (e.g., with candidate generator 512), and each of the candidate motion goal paths can be respectively represented by a node on a graph. In some implementations, path information and context information along or otherwise associated with the path are embedded or otherwise associated with each node for the candidate motion goal paths. For example, context information can include features of the environment (e.g., natural features, manufactured features, legal or regulatory features, etc., such as terrain, roads, signage and signals, legal rights of way, regulation on movement in the environment, other moving actors, etc.). In some implementations, the moving actor is also represented by a node on the graph. In some implementations, the moving actor's state (e.g., past and/or present states) is embedded or otherwise associated with the node for the moving actor.

In some implementations, a graph of candidate motion goal paths (e.g., a graph as in any of the implementations described above) can be encoded, evaluated, and/or otherwise processed by a graph neural network. For example, a graph neural network can receive a set of inputs (e.g., map data, perception data, position data for one or more objects in an environment, context information, etc.) and encode information about the motion goal paths and/or the moving actor itself (e.g., state data) into the graph. For example, the information may be encoded as latent features associated with one or more nodes of the graph. In some implementations, the graph neural network can operate as part of a machine-learned model pipeline including multiple machine-learned models. For example, one or more machine-learned models can preprocess the inputs before passing intermediate node information (e.g., initial node values) to the graph neural network. For example, in some implementations, one or more convolutional neural networks and/or one or more recurrent neural networks may be used upstream from a graph neural network. In some implementations, for example, one or more goal nodes are encoded using one or more convolutional neural networks and the node for the moving actor is encoded using the recurrent neural network. In some implementations of a graph neural network, a mean function may be used as an aggregate function.

In some implementations, a candidate evaluator component 514 can output one or more scores for a plurality of candidate motion goal paths (e.g., a machine-learned model, such as a graph neural network, etc.). For example, a score can be or correlate to an estimated likelihood (e.g., a probability) that the moving actor will follow the motion goal path. A candidate evaluator component 514 can, for example, score the candidate motion goal paths corresponding to a probability distribution (e.g., totaling 1) and/or score in a discrete fashion, such as effectively a "one-hot" output (e.g., with the most likely candidate having a score of one).

In some implementations, the goals determined by a goal developer (e.g., goal developer 510) include map-based goals. A map-based goal can include, for instance, motion goal paths based at least in part on one or more features of map data for an environment around the moving actor (e.g., terrain, obstacles, travel ways, legal and/or regulatory features, etc.). For example, in an implementation in which a moving actor is traveling on a roadway, a map-based goal can be determined at least in part on one or more lanes of the roadway (e.g., including any intersecting roadways/lanes/turnoffs, etc.). In some examples, map-based goals can be determined using a graph-based approach. For instance, a portion of a map (e.g., from the map data) can be used as a lane graph, where each node is a lane (e.g., without branching points) and an edge connects two lanes if traversing between them is permitted by, for instance, traffic laws, lane structure, obstacles, or other restrictions (e.g., other vehicles, etc.).

In some implementations, the goals determined by a goal developer (e.g., goal developer 510) include map-free goals. A map-free goal can include, for instance, motion goal paths based at least in part on non-map information (e.g., based on entirely non-map information). For example, map-free goals can be based at least in part on predictions of likely future headings based on a past and/or present heading of the moving actor. In some implementations, map-free goals can capture or predict idiosyncratic behavior of the moving actor (e.g., behavior that deviates from expectations associated with one or more map-based goals). For example, a moving actor may be traveling along a roadway in a lane, giving rise to a map-based expectation that the actor might continue to travel within the lane. However, based on a present heading that appears to grossly deviate from that typically expected from travel within the lane (e.g., swerving, etc.), a map-free goal may include a motion goal path that swerves across one or more lanes (e.g., across a road centerline) and/or off the roadway itself.

As shown in the illustration in FIG. 5, in some implementations, goals developed by the goal developer 510 can be used by a trajectory developer 520 to determine one or more trajectories for achieving (e.g., arriving at or sufficiently near to) one or more of the candidate motion goal paths (e.g., achieving one or more waypoints associated with a candidate motion goal path). The trajectory developer 520 can include, in some implementations, a trajectory timer component 522 for determining one or more temporal characteristics of the moving actor's traversal of one or more determined trajectories (e.g., a rate of change of position, including temporal derivatives, approximations thereof, etc.). For example, in some implementations, the trajectory timer component 522 associates timestamps with one or more waypoints along a determined trajectory. In some implementations, the trajectory time component 522 determines one or more acceleration profiles for the moving actor's expected traversal of the trajectory. The trajectory developer 520 can also include, in some implementations, a trajectory shaper component 524 to determine spatial characteristics (e.g., position, curvature, waypoints, etc.) of the moving actor's traversal toward the targets (e.g., the shape of one or more trajectories toward the target(s)).

In some implementations, a trajectory developer (e.g., trajectory developer 520) can include one or more machine-learned models. Example machine-learned models include neural networks or other non-linear models (e.g., multi-layer models). Example neural networks include feed forward neural networks, deep neural networks, recurrent neural networks, convolutional neural networks, graph neural networks, and combinations thereof. Some example machine-learned models can leverage an attention mechanism such as self-attention. For example, some example machine-learned models can include multi-headed self-attention models (e.g., transformer models).

For example, a trajectory timer (e.g., trajectory timer 522) can include one or more machine-learned models to determine temporal characteristics associated with one or more candidate motion goal paths. In this manner, for example, a temporal mode of motion can be provided (e.g., as a complement to the spatial mode(s) of the motion goal paths). For example, each of a plurality of candidate motion goal paths may be input into one or more machine-learned models to generate a respective temporal mode (e.g., position-and-time profile, velocity profile over time and/or space, acceleration profile over time and/or space, etc.). For example, each candidate motion goal path can be associated with a plurality of temporal modes. In some implementations, a plurality of temporal prediction networks may be used, optionally with each learning a different motion goal path type, and optionally with a prediction network to learn the probabilities for predicting each temporal mode. In some implementations, the temporal modes can be directly constrained to enforce desired output characteristics (e.g., to enforce realistic or desired acceleration ranges, etc.).

In some implementations, a trajectory timer can output one or more scores for a plurality of temporal modes. For example, a score can be or correlate to an estimated likelihood (e.g., a probability) that the moving actor will follow the temporal mode. In some implementations, the plurality of temporal modes may be scored corresponding to a probability distribution (e.g., totaling 1) and/or score in a discrete fashion, such as effectively a "one-hot" output (e.g., with the most likely mode having a score of one). In some implementations, a score or probability can be assessed for one or more combinations of candidate motion goal paths and temporal modes. In some implementations, each combination of the candidate motion goal paths and temporal modes receives a corresponding score.

In some implementations, a trajectory timer (e.g., trajectory timer 522) can include one or more machine-learned models (e.g., neural networks) for generating one or more temporal modes. For example, in one implementation, a trajectory timer can include a convolutional neural network. In one implementation, a trajectory timer can include a convolutional neural network for processing map data for the environment around an actor to determine the temporal mode(s). In some implementations, one or more machine-learned models of the trajectory timer may be trained using unsupervised training techniques. For instance, in training of the trajectory timer, a ground truth temporal mode can be directly regressed from training data. In some implementations, a subsequent parameter update for the trajectory timer is based on (e.g., based only on) a gradient flowing back from the temporal mode best matching the regressed ground truth. For instance, in some implementations, a multi-modal loss may be used to simultaneously learn to increase the score (e.g., probability) of the best-matching temporal mode (e.g., push probability to one) and learn to decrease the score (e.g., probability) of the other temporal modes (e.g., push probability to zero). For example, in some training implementations, one or more parameters used to generate the best-matching temporal mode output itself (e.g., the acceleration profile, etc.) may be updated while one or more parameters used to generate scores associated with the temporal mode(s) may be updated for all the modes. In this manner, for instance, some implementations may provide for predicted temporal modes adapted to the various spatial modes.

A trajectory developer (e.g., trajectory developer 520) can, in some implementations, generate one or more trajectory shapes for the candidate motion goal paths. In some implementations, a trajectory shape is generated for each combination of a set of candidate motion goal paths and a set of temporal modes. In this manner, for instance, each generated trajectory can be associated with one or more scores (e.g., scores associated with the candidate motion goal paths, the temporal modes, combinations thereof, etc.).

In some implementations, a trajectory developer (e.g., trajectory developer 520) can include or are otherwise based on one or more algorithmic techniques. In some aspects, algorithms and algorithmic techniques can include robotics techniques. Algorithmic techniques can include, for instance, rule-based decision-making. In some implementations, algorithmic techniques are informed or otherwise guided by a priori knowledge of the actor of the decision-making (e.g., a moving actor). For example, in some implementations, algorithmic techniques can be derived from or otherwise embedded with distilled knowledge about the physical world (e.g., physics equations, dynamics equations, mechanical properties, electrical properties, actor specifications such as vehicle and/or object specifications, etc.). In this manner, for example, various algorithmic techniques can help generate trajectories reflective of real-world behavior. In some implementations, the algorithmic techniques can provide interpretable constraints based on desired outcomes (e.g., a desired parameter space for a generated trajectory, a feasible parameters space, etc.).

For example, a trajectory shaper (e.g., trajectory shaper 524) can include or otherwise implement an algorithmic technique for determining spatial characteristics of one or more trajectories for traversing a candidate motion goal path. For instance, an algorithmic technique can, in some implementations, receive a candidate motion goal path (e.g., or a goal point thereon) and algorithmically determine the shape of a trajectory for obtaining the goal (e.g., arriving at or sufficiently near the goal point).

For example, in some implementations, a pursuit algorithm is used. In some implementations, a pursuit algorithm determines the curvature of an arc that will connect a first position (e.g., of a moving actor) to a second goal position. In this manner, a moving actor can be considered to "pursue" the goal point using the arc determined by the algorithm. The distance between the first position and the second position may be referred to as a lookahead distance, invoking the intuition of how a human generally pilots a vehicle by looking ahead down the road and driving according to the direction of vision. In general, however, it is to be understood that a pursuit algorithm is described herein for illustration purposes only, and that various algorithmic techniques for shaping one or more trajectories may be used.

Figure 6:
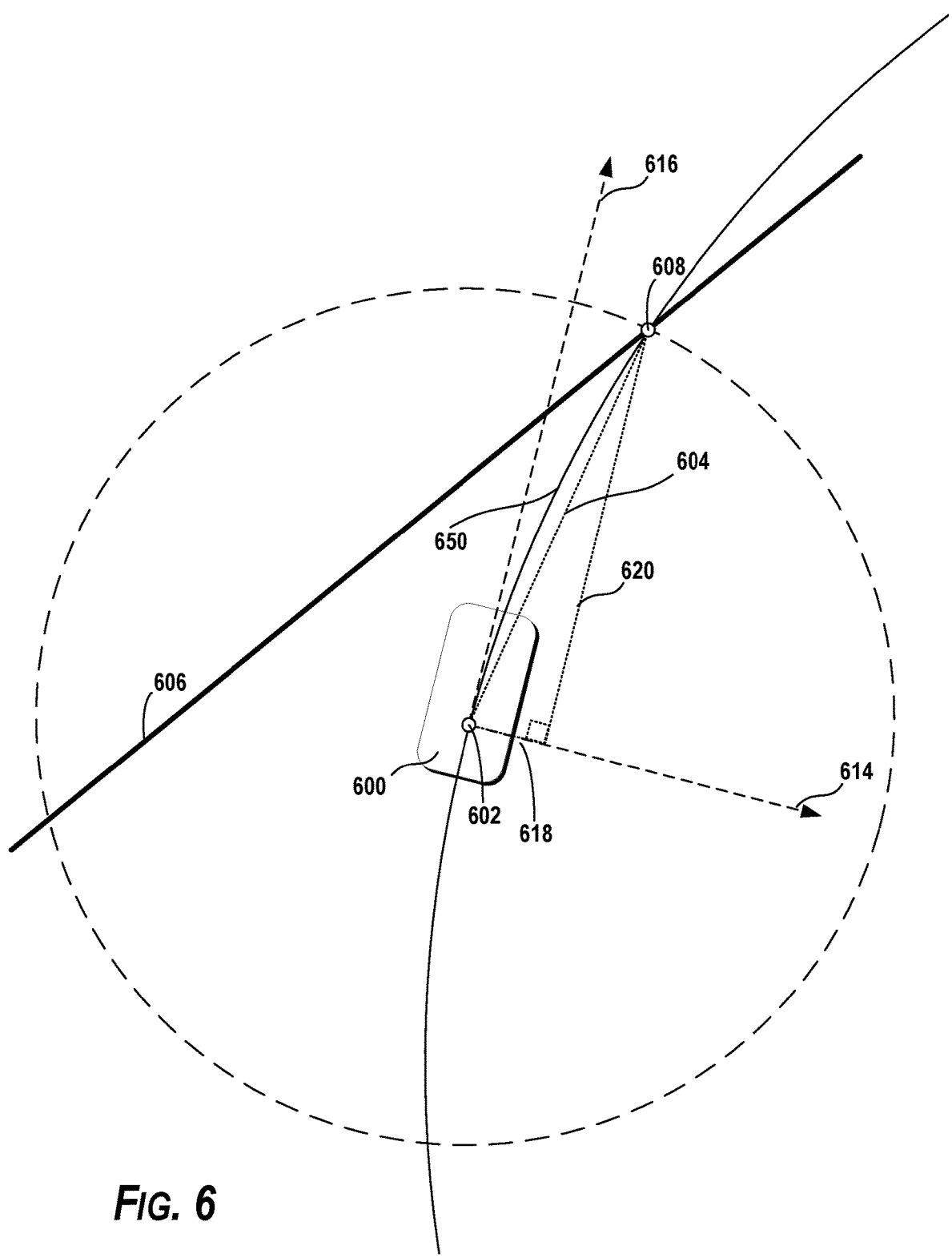
FIG. 6 illustrates an example algorithm according to some implementations of the present disclosure.

FIG. 6 illustrates various example aspects of an algorithmic technique for shaping a trajectory. The illustration in FIG. 6 depicts a first instant in time. A moving actor 600 has a reference point 602 (e.g., a control point) centered within a circle having a radius of lookahead distance 604. The moving actor 600 is moving toward a desired path 606 (e.g., a candidate motion goal path), which intersects the circle at a goal point 608. Although the path 606 also intersects the circle in at a second point, the second point is behind the moving actor 600 and may be ignored in some implementations. Thus, a goal point 608 is determined on the path 606 one lookahead distance 604 away. A reference frame can be defined anchored to the moving actor 600 (e.g., at the control point 602) with lateral direction 614 and longitudinal direction 616. The relative position of the goal point 608 can be expressed in the reference frame with lateral distance 618 and longitudinal distance 620. In some implementations, the longitudinal direction 616 is a heading direction. In some implementations, a heading direction can be determined from one or more preceding positions and/or orientations of the control point.

As illustrated, an arc 650 can be defined to connect the control point 602 and the goal point 608. The longitudinal direction 616 may, in some implementations, be tangential to the arc 650. The curvature of the arc 650 can be, for example, proportional to the ratio between the magnitude of the lateral distance 618 and the square of the lookahead distance 605 (e.g., twice the ratio). For instance, in some implementations, the curvature of the arc 650 can be expressed as $k=2|x_g|L^{-2}$, where $x_g$ is the lateral distance 618 and L is the lookahead distance 605.

In the example illustrated in FIG. 6, the curvature of the arc 650 provides one approach for setting interpretable realism constraints for trajectories generated by the algorithm. For instance, a moving actor may have limitations on feasible trajectory curvatures (e.g., due to mechanical constraints, area constraints, desired targets such as comfort or safety constraints, etc.). For example, the algorithm may be constructed to select, in some implementations, the greater of (a) the curvature determined as above and (b) a minimum specified curvature. If (b) is selected, an output trajectory may not exactly intersect the desired goal point 608, but the trajectory can adhere to the desired specification (e.g., a desired real-world characteristic). For instance, in some implementations, the curvature selected by the algorithm can be expressed as $$\kappa = \max\left(\frac{2|x_g|}{L^2}, M_\kappa\right),$$

where $M_k$ indicates the minimum curvature value.

In some implementations, one or more other parameters may be specified in the algorithmic technique. For example, a lateral speed constraint can be enforced by evaluating the lateral component of the velocity v (e.g., a component in the lateral direction 614) to determine if the lateral speed exceeds a specified value. A centripetal acceleration constraint can be enforced by evaluating the centripetal component of the acceleration a (e.g., a component in the lateral direction 614) to determine if the centripetal acceleration exceeds a specified value. A tangential acceleration constraint can be enforced by evaluating the tangential component of the acceleration a (e.g., a component in the longitudinal direction 616) to determine if the tangential acceleration exceeds a specified value. If any constraint (e.g., any one or more of the example constraints described herein) is violated, then the trajectory may be rejected as undesired and/or infeasible, in some implementations. In this manner, for instance, an algorithmic approach that embeds interpretable constraint parameters can provide improved confidence (e.g., a guarantee, in some implementations) that desired real-world relevant parameters will be satisfied.

The curvature of the arc 650 can be used in an algorithm to help update one or more predicted state values. For instance, the curvature of the arc 650 can be used to update a heading direction (e.g., corresponding to longitudinal direction 616). For example, an updated heading direction can be determined by adding a heading update value to a heading from a prior time step. For instance, the heading update value can correspond to the product of a velocity, a time interval, and the curvature. In some implementations, for example, an updated heading h for the i-th moving actor at a time step t+1 can be expressed as $h_{t+1}^i = h_t^i + v_{t\Delta_t}^i k$, where v indicates velocity and $\Delta_t$ indicates a time interval. The heading value may be used to update one or more position values, such as, for example by decomposing the heading vector into the reference frame, scaling it according to the distance traveled over the time interval (e.g., $v_{t\Delta_t}^i$), and adding the resulting value to a prior time position value. For instance, letting $p_x$ denote lateral position and $p_y$ denote longitudinal position, in some implementations $P_{x_{t+1}}^i = P_{x_t}^i + \cos(h_t^i) v_t^i \Delta_t$ and $P_{y_{t+1}}^i = p_{y_t}^i + \sin(h_t^i) v_t^i \Delta_t$.

The temporal parameters of the example algorithms discussed above may be provided by, for example, a trajectory timer (e.g., trajectory timer 522). For example, one or more motion profiles may be output by a trajectory timer (e.g., acceleration profile), and the acceleration profile(s) may then be used to update, for example, the velocity state parameter. For instance, in some implementations, $v_{t+1}^i = v_t^i + a_t^i \Delta_t$, where a denotes acceleration.

Therefore, in one example implementation, an algorithmic trajectory shaper can execute one or more state updates as may be expressed in Equation 1.

$$p_{x_{t+1}}^i = p_{x_t}^i + \cos(h_t^i)v_t^i\Delta_t$$
$$p_{y_{t+1}}^i = p_{y_t}^i + \sin(h_t^i)v_t^i\Delta_t$$
$$v_{t+1}^i = v_t^i + a_t^i\Delta_t$$
$$\kappa = \max\left(\frac{2x_g}{L^2}, M_\kappa\right)$$
$$h_{t+1}^i = h_t^i + v_t^i\Delta_t\kappa$$
(1)

With reference again to FIG. 5, in some implementations, the example system 500 may include one or more machine-learned models for predicting one or more goals of a moving actor. For instance, the goal developer 510 can leverage the power of one or more data-trained predictive models to estimate likely paths for the moving actor to follow and/or one or more goals along those paths.

In some implementations, the example system 500 may include one or more algorithms for determining one or more trajectories for the moving actor to traverse toward the goals. For instance, the trajectory developer 520 can leverage algorithms embedded with inherent (e.g., implicit, explicit, etc.) dependence on knowledge of real-world trajectories for the moving actor to generate trajectories that correlate with or otherwise correspond to trajectories expected for the moving actor in the real world. In some implementations, one or more algorithms used by the trajectory developer 520 can provide one or more constraints corresponding to interpretable, real-world criteria (e.g., desired design criteria, system limitation criteria, etc.).

Figure 7:
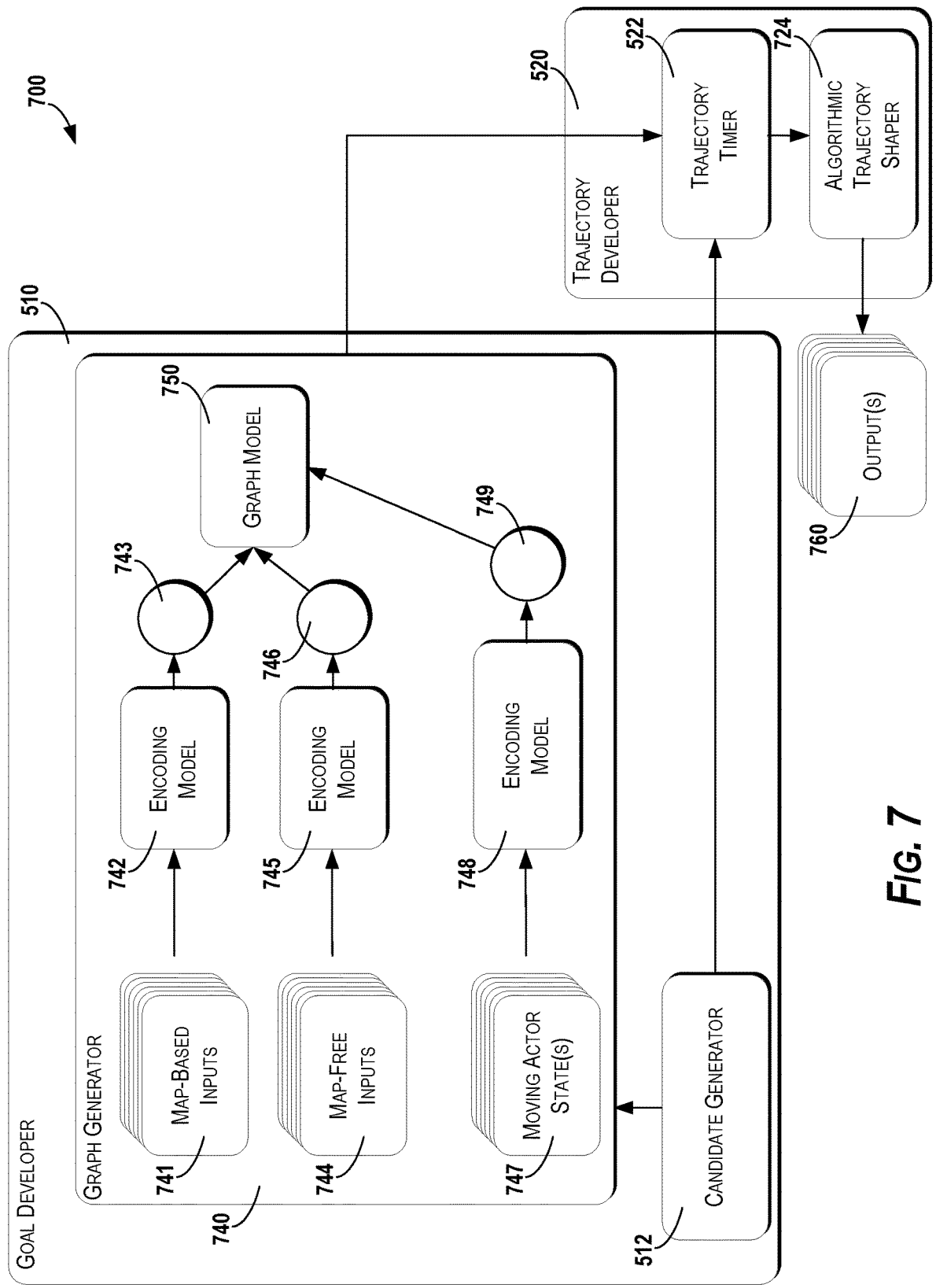
FIG. 7 is an example of a trajectory generation system according to some implementations of the present disclosure.

For example, FIG. 7 depicts one example system 700 that combines various machine-learned models and algorithmic techniques in an example trajectory generation pipeline. Example system 700 includes a goal developer 510 containing a candidate generator component 512 (e.g., as described above). Candidate motion goal paths generated by the candidate generator component 512 may be passed to a graph generator 740 for evaluation (e.g., as candidate evaluator 514). In the graph generator 740, map-based inputs 741 may be processed (e.g., encoded, transformed, embedded, etc.) by an encoding model 742 (e.g., a machine-learned model, such as a convolutional neural network or other neural network) to output map-based goal nodes 743. Similarly, map-free inputs 744 may be processed (e.g., encoded, transformed, embedded, etc.) by an encoding model 745 (e.g., a machine-learned model, such as a convolutional neural network or other neural network) to output map-free goal nodes 746. In various implementations, the encoding model 742 may be the same as or different than the encoding model 745. In the map generator 740, moving actor state(s) 747 may be processed (e.g., encoded, transformed, embedded) by an encoding model 748 (e.g., a machine-learned model, such as a convolutional neural network or other neural network) to output nodes 749 associated with the moving actor.

As illustrated in FIG. 7, the map-based goal nodes 743, the map-free goal nodes 746, and the nodes 749 associated with the moving actor may be provided to graph model 750. Graph model 750 can include one or more graph neural networks (e.g., as described above with respect to a goal developer more generally) to generate, evaluate, and/or process a graph containing the map-based goal nodes 743, the map-free goal nodes 746, and the nodes 749 associated with the moving actor. An output of the graph generator 740 (e.g., including one or more goals and a probability associated therewith) may be provided to the trajectory timer 522 of the trajectory developer 520. The trajectory timer 522 may pass an output (e.g., a temporal mode, such as an acceleration profile) to algorithmic trajectory shaper 724. Algorithmic trajectory shaper 724 can execute or otherwise implement one or more algorithmic techniques for shaping one or more trajectories (e.g., a pursuit algorithm, or other algorithms). The outputs 760 can include, for example, one or more generated trajectories for the moving actor.

With reference again to FIG. 5, the example system 500 optionally also contains a training subsystem 530. In some implementations, the example system 500 is end-to-end trainable. In some implementations, each component of example system 500 is differentiable. The training subsystem 530 contains a trainer 540 configured to receive one or more outputs from the goal developer 510 and the trajectory developer 520, determine one or more objectives 542, and implement one or more updaters 544. The updater(s) 544 are configured to update one or more parameters of the goal developer 510 and optionally one or more parameters of the trajectory developer 520 (e.g., one or more parameters of the trajectory timer 522). For instance, the updater(s) 544 can perform one or more machine-learning methods for updating parameters of the goal developer 510 and/or the trajectory developer 520 (e.g., backpropagation, genetic and/or evolutionary approaches, etc.). For instance, one or more parameters of the candidate generator 512, candidate evaluator 514, trajectory timer 522, and/or trajectory shaper 524 may be updated. In some implementations, for example, a trajectory timer can include a plurality of models for predicting temporal modes for each of a set of motion goal path groups, and the parameters of the plurality of models can be updated together or updated at different times. For example, in some embodiments, the parameters of only the model having predicted the best performing output has its parameters updated.

In some implementations, the objective(s) 542 include an objective (e.g., a score and/or a loss) that is based at least in part on both a performance of the goal developer 510 and a performance of the trajectory developer 520. For example, with reference to a ground truth instance, a loss may be determined that correlates both to whether the correct candidate motion goal path was predicted and selected (e.g., based on comparing the estimated probability distribution of all candidate motion goal paths to a one-hot distribution for the correct ground truth motion goal path) and to whether the trajectory developer generated a trajectory that aligned with the ground truth trajectory (e.g., based on a distance metric, such as an $L_1$ metric). In this manner, for instance, an object may be based at least in part on an output from a portion of the machine-learned trajectory generation model configured to predict where the trajectory is leading (e.g., a goal) and also based at least in part on a portion of the machine-learned trajectory generation model configured to predict the shape of the trajectory (e.g., a portion of the trajectory generation model pipeline implementing algorithmic techniques).

In some implementations, for example, the objective can include a total loss based at least in part on a mode classification loss (e.g., corresponding to prediction of the best mode, such as the best temporal mode, best spatial mode, or the best combination thereof) and based at least in part on a trajectory error loss (e.g., corresponding to a distance metric between the output trajectory, such as the trajectory predicted to be most probable, and a reference trajectory). For example, in one embodiment, a loss £ may expressed as in Equation 2, $$\mathcal{L} = \sum_{i \in \mathcal{A}} \sum_{g \in G^i} \left[ \left( -\sum_{t \in \mathcal{T}^g} p_t \log \hat{p}_t \right) + \left( \sum_{t \in \mathcal{T}^g} p_t L_1(\tau_i, \hat{\tau}^t) \right) \right] \quad (2)$$

where the summation of $p_t \log \hat{p}_t$ forms a motion goal path classification loss (e.g., mode classification loss) and where the summation of $p_t L_1(\tau_i, \hat{\tau}^t)$ forms a trajectory error loss. In Equation 2, $\mathcal{A}$ is the set of all moving actors under consideration, $G^i$ is the set of all goals for the i-th actor, $\mathcal{T}^g$ is the set of all temporal modes for the g-th goal, $p_t$ and $\hat{p}_t$ are the target and predicted probabilities of temporal mode t, respectively, and $\tau_i$ and $\hat{\tau}^t$ are the ground truth and predicted trajectories, respectively.

Figure 8:
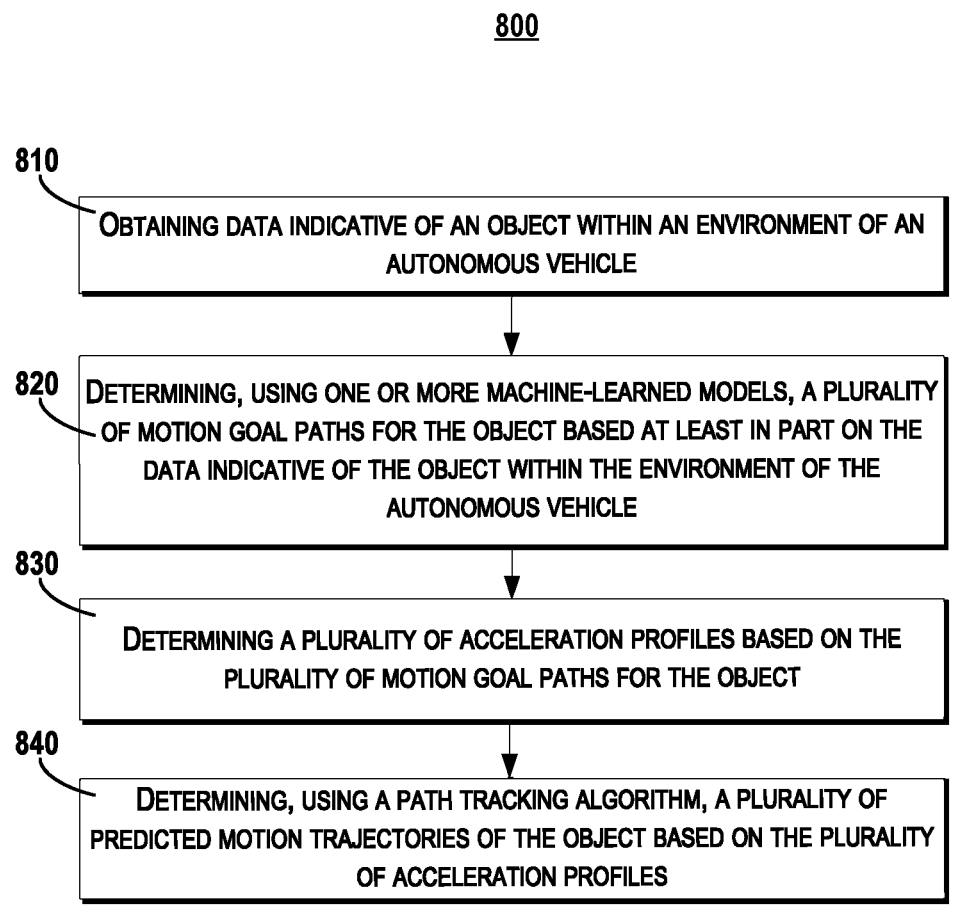
FIG. 8 is a flowchart of a method for generating trajectories according to some aspects of the present disclosure.

FIG. 8 is a flowchart of a method 800 for generating trajectories according to some aspects of the present disclosure. One or more portion(s) of the method 800 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, system 700, etc.). Each respective portion of the method 800 can be performed by any (or any combination) of one or more computing devices. Moreover, one or more portion(s) of the method 800 can be implemented on the hardware components of the device(s) described herein (e.g., as in FIGS. 1, 2, 5, 7, 11, etc.), for example, to output the performance metrics discussed herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

While the following describes the example method 800 (and other methods described herein) with respect to predicting trajectories of an actor like an object within the environment of an autonomous vehicle, this is not meant to be limiting. The method 800 (and other methods herein) can be utilized to generate trajectories for other actors such as, for example, to generate motion trajectories for an autonomous vehicle (e.g., for motion planning purposes).

At 810, the method 800 includes obtaining data indicative of an object within an environment of an autonomous vehicle. For example, a computing system (e.g., autonomous platform 105, vehicle computing system 210, operations computing system(s) 290A, remote computing system(s) 290B, system 440, etc.) can receive, perceive, record, or otherwise obtain the data indicative of the object.

At 820, the method 800 includes determining, using one or more machine-learned models, a plurality of motion goal paths for the object based at least in part on the data indicative of the object within the environment of the autonomous vehicle. For example, the one or more machine-learned models can include one or more models selected from a graph neural network model, a convolutional neural network model, and a recurrent neural network model (e.g., as described above with respect to FIG. 5 and FIG. 7).

At 830, the method 800 includes determining a plurality of acceleration profiles based on the plurality of motion goal paths for the object. For example, the plurality of acceleration profiles may be determined at least in part by a trajectory timer (e.g., a trajectory timer 522).

At 840, the method 800 includes determining, using a path tracking algorithm, a plurality of predicted motion trajectories of the object based on the plurality of acceleration profiles. For example, the path tracking algorithm can include algorithmic techniques as discussed above with respect to FIGS. 5, 6, and 7.

Figure 9:
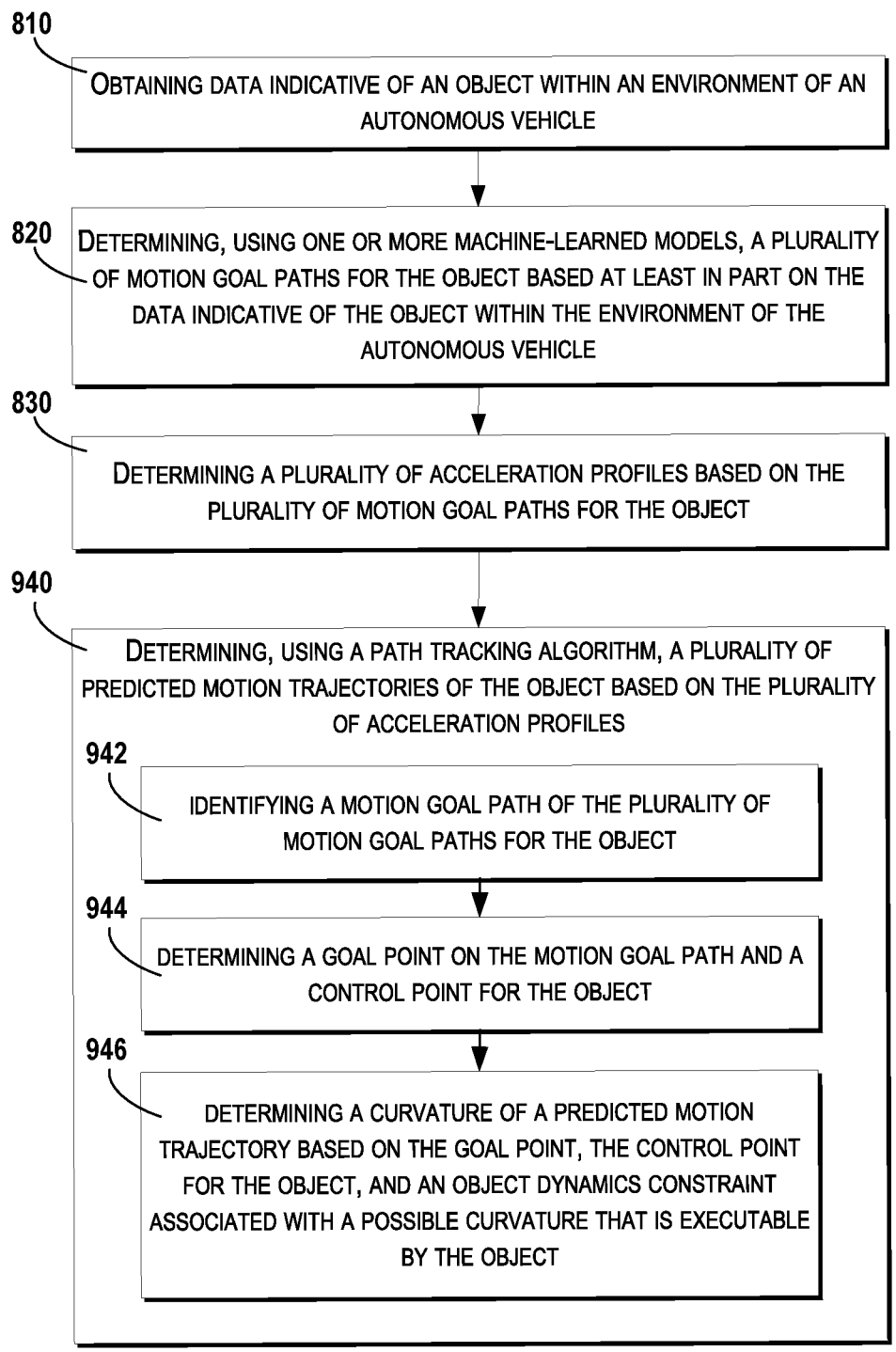
FIG. 9 is a flowchart of a method for generating trajectories according to some aspects of the present disclosure.

FIG. 9 is another flowchart of a method 900 for generating trajectories according to some aspects of the present disclosure. One or more portion(s) of the method 900 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 500, system 700, etc.). Each respective portion of the method 900 can be performed by any (or any combination) of one or more computing devices. Moreover, one or more portion(s) of the method 900 can be implemented on the hardware components of the device(s) described herein, for example, to generate performance metrics. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

The method 900 can include various portions of method 800, as illustrated. However, as shown, the method 900 can include, at 940, determining, using a path tracking algorithm, a plurality of predicted motion trajectories of the object based on the plurality of acceleration profiles, where the determining can include subportions 942, 944, and 946 of method 900.

At 942, method 900 includes identifying a motion goal path of the plurality of motion goal paths for the object. In some implementations, the motion goal path can be identified based at least in part on a score for the motion goal path.

At 944, method 900 includes determining a goal point on the motion goal path and a control point for the object. In some implementations, the goal point can be determined based at least in part on a lookahead distance.

At 946, method 900 includes determining a curvature of a predicted motion trajectory based on the goal point, the control point for the object, and an object dynamics constraint associated with a possible curvature that is executable by the object.

Figure 10:
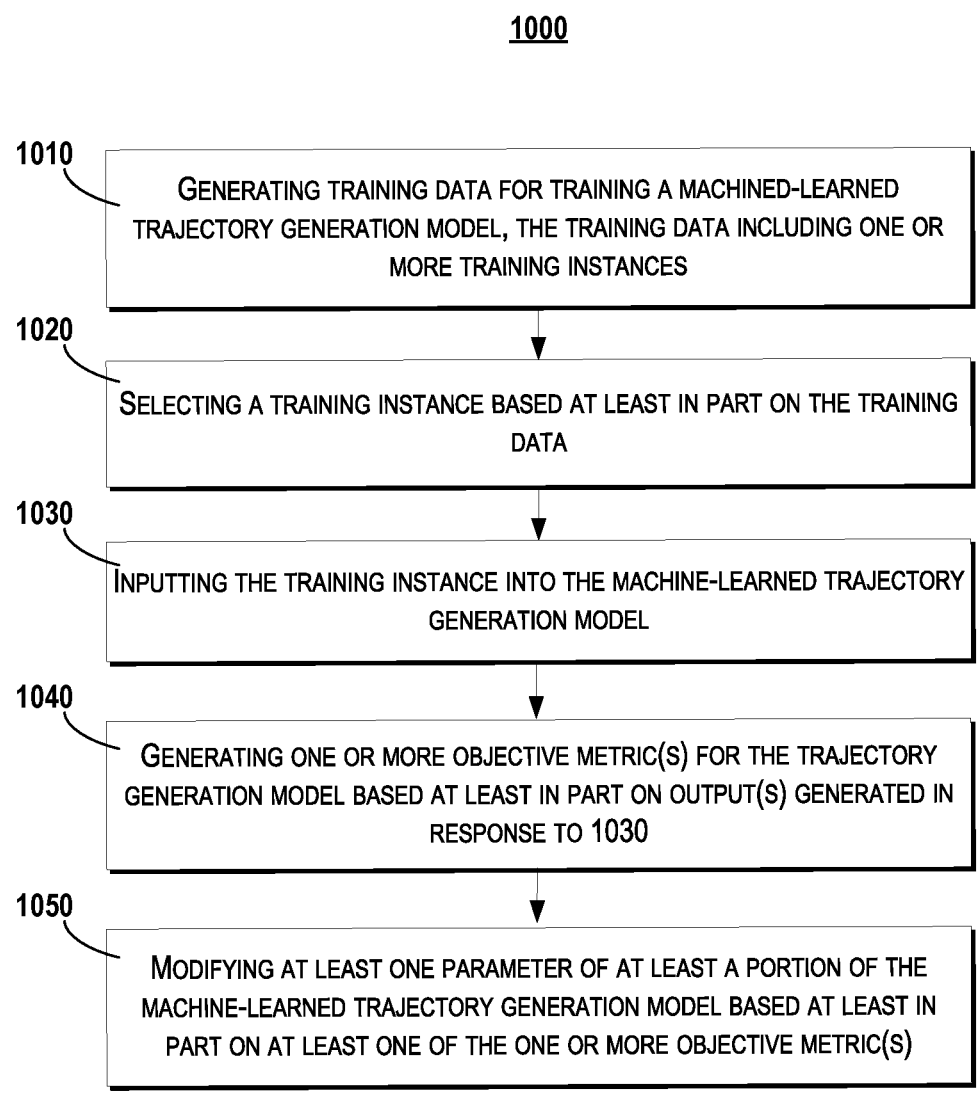
FIG. 10 is a flowchart of a method for training a machine-learned model for generating trajectories according to some aspects of the present disclosure.

FIG. 10 depicts a flowchart of a method 1000 for training one or more example machine-learned models (e.g., as discussed above with respect to FIG. 5) according to aspects of the present disclosure. One or more portion(s) of the method 1000 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 300, system 700, a system of FIG. 11, etc.). Each respective portion of the method 1000 can be performed by any (or any combination) of one or more computing devices. Moreover, one or more portion(s) of the method 1000 can be implemented on the hardware components of the device(s) described herein (e.g., as in FIGS. 1, 2, 5, 7, 11, etc.), for example, to train machine-learned models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1010, the method 1000 can include generating training data for training a machine-learned trajectory generation model (e.g., a model containing or otherwise implementing one or more portions of example system 500 and/or example system 700). For example, a computing system (e.g., autonomous platform 105, vehicle computing system 210, operations computing system(s) 290A, remote computing system(s) 290B, system 500, system 700, system of FIG. 11, etc.) can generate the training data for training the machine-learned trajectory generation model. The training data can include a plurality of training instances, such as pre-recorded inputs (e.g., perception data, map data, etc.) corresponding to ground truth trajectories (e.g., recorded trajectories for one or more moving actors).

The training data can be collected using one or more autonomous platforms (e.g., autonomous platform 105) or the sensors thereof as the autonomous platform is within its environment. By way of example, the training data can be collected using one or more autonomous vehicle(s) (e.g., autonomous platform 105, autonomous vehicle 205, etc.) or sensors thereof as the vehicle(s) operates along one or more travel ways. The training data can include a plurality of training sequences divided between multiple datasets (e.g., a training dataset, a validation dataset, or testing dataset). Each training sequence can include a plurality of map data, context information, pre-recorded perception data, etc.

In some implementations, each sequence can include LiDAR point clouds (e.g., collected using LiDAR sensors of an autonomous platform) or high definition map information (e.g., structured lane topology data). For instance, in some implementations, a plurality of images can be scaled for training and evaluation.

At 1020, the method 1000 can include selecting a training instance based at least in part on the training data. For example, a computing system can select the training instance based at least in part on the training data.

At 1030, the method 1000 can include inputting the training instance into the machine-learned trajectory generation model. For example, a computing system can input the training instance into the machine-learned trajectory generation model.

At 1040, the method 1000 can include generating loss metric(s) for the machine-learned trajectory generation model based on output(s) of at least a portion of the machine-learned trajectory generation model in response to inputting the training instance (e.g., at 1030). For example, a computing system can generate the loss metric(s) for the machine-learned trajectory generation model based on the output(s) of at least the portion of the machine-learned trajectory generation model in response to the training instance. The loss metric(s), for example, can include a loss based at least in part on an output from a portion of the machine-learned trajectory generation model configured to predict where the trajectory is leading (e.g., a goal) and also based at least in part on a portion of the machine-learned trajectory generation model configured to predict the shape of the trajectory (e.g., a portion of the trajectory generation model pipeline implementing algorithmic techniques).

At 1050, the method 1000 can include modifying at least the portion of the machine-learned trajectory generation model based at least in part on at least one of the loss metric(s). For example, a computing system can modify at least the portion of the machine-learned trajectory generation model based, at least in part, on at least one of the loss metric(s).

Figure 11:
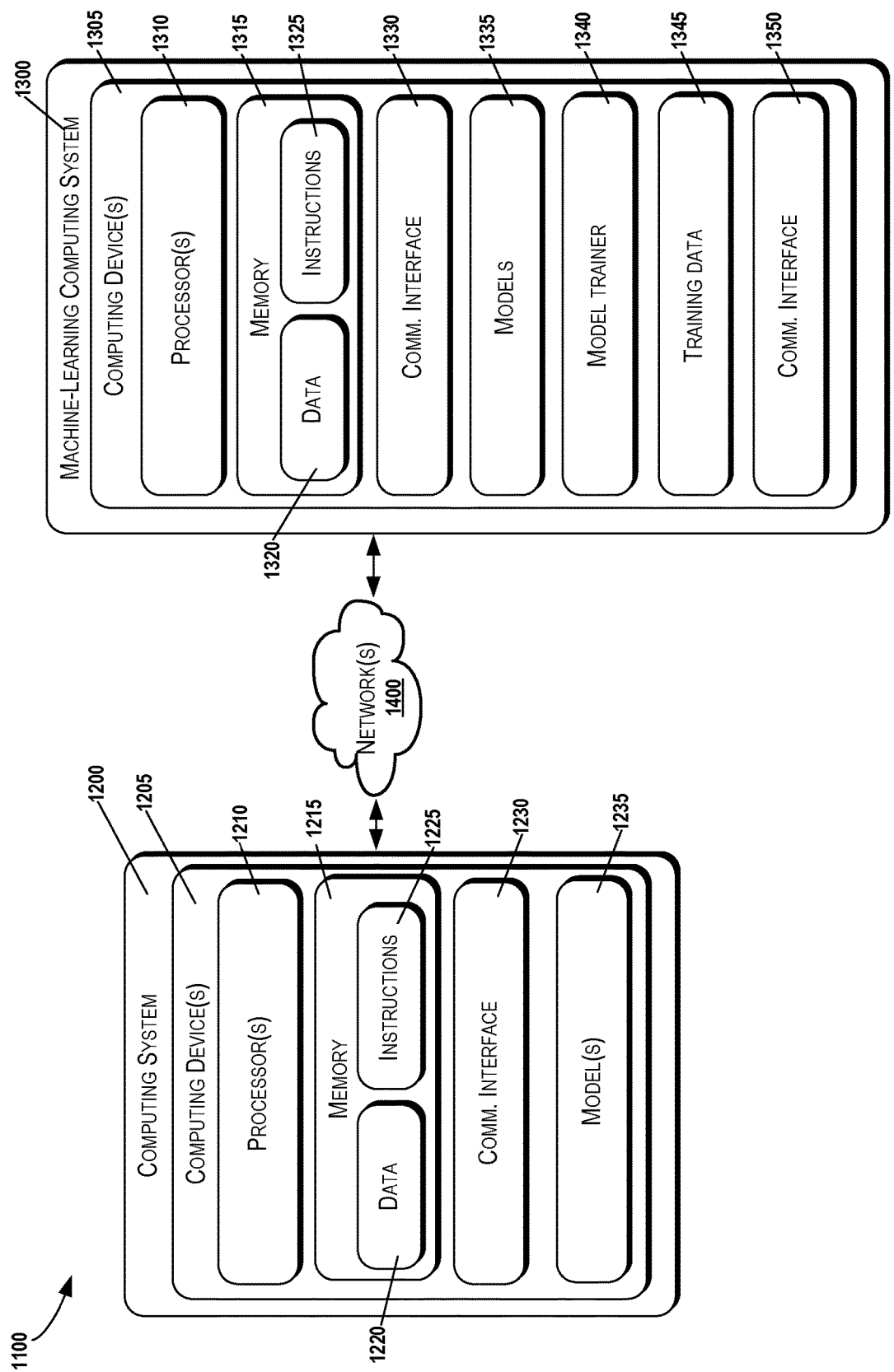
FIG. 11 is a block diagram of a computing system, according to some embodiments of the present disclosure.

FIG. 11 is a block diagram of an example computing system 1100, according to some embodiments of the present disclosure. The example system 1100 includes a computing system 1200 and a machine-learning computing system 1300 that are communicatively coupled over one or more networks 1400.

In some implementations, the computing system 1200 can perform one or more observation tasks such as, for example, by obtaining sensor data (e.g., two-dimensional, three-dimensional, etc.) associated with a dynamic object. In some implementations, the computing system 1200 can be included in an autonomous platform. For example, the computing system 1200 can be on-board an autonomous vehicle. In other implementations, the computing system 1200 is not located on-board an autonomous platform. The computing system 1200 can include one or more distinct physical computing devices 1205.

The computing system 1200 (or one or more computing device(s) 1205 thereof) can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data, two-dimensional data, three-dimensional, image data, LiDAR data, model parameters, simulation data, trajectory data, data associated with graphs and graph nodes, acceleration profiles, algorithms (e.g., path tracking algorithms), or any other data or information described herein. In some implementations, the computing system 1200 can obtain data from one or more memory device(s) that are remote from the computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system 1200) to perform any of the operations, functions, or methods/processes described herein, including, for example, obtaining sensor data, generating graphs, generating acceleration profiles, generating trajectories, etc.

According to an aspect of the present disclosure, the computing system 1200 can store or include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a goal developer, trajectory developer, trainer, or combinations thereof.

In some implementations, the computing system 1200 can receive the one or more machine-learned models 1235 from the machine-learning computing system 1300 over network(s) 1400 and can store the one or more machine-learned models 1235 in the memory 1215. The computing system 1200 can then use or otherwise implement the one or more machine-learned models 1235 (e.g., by processor(s) 1210). In particular, the computing system 1200 can implement the machine-learned model(s) 1235 to generate trajectories, etc.

The machine learning computing system 1300 can include one or more computing devices 1305. The machine learning computing system 1300 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, sensor data, two-dimensional data, three-dimensional, image data, LiDAR data, model parameters, simulation data, data associated with models, trajectory data, data associated with graphs and graph nodes, acceleration profiles, algorithms (e.g., path tracking algorithms), or any other data or information described herein. In some implementations, the machine learning computing system 1300 can obtain data from one or more memory device(s) that are remote from the machine learning computing system 1300.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, training a machine-learned trajectory generation model, generating trajectories, etc.

In some implementations, the machine learning computing system 1300 includes one or more server computing devices. If the machine learning computing system 1300 includes multiple server computing devices, such server computing devices can operate according to various computing architectures, including, for example, sequential computing architectures, parallel computing architectures, or some combination thereof.

In addition, or alternatively to the model(s) 1235 at the computing system 1200, the machine learning computing system 1300 can include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a goal developer, trajectory developer, trainer, or combinations thereof.

In some implementations, the machine learning computing system 1300 or the computing system 1200 can train the machine-learned models 1235 or 1335 through use of a model trainer 1340. The model trainer 1340 can train the machine-learned models 1235 or 1335 using one or more training or learning algorithms. One example training technique is backwards propagation of errors. In some implementations, the model trainer 1340 can perform supervised training techniques using a set of labeled training data. In other implementations, the model trainer 1340 can perform unsupervised training techniques using a set of unlabeled training data. By way of example, the model trainer 1340 can train the machine-learned trajectory generation model through unsupervised energy minimization training techniques using an objective function (e.g., as described herein). The model trainer 1340 can perform a number of generalization techniques to improve the generalization capability of the models being trained. Generalization techniques include weight decays, dropouts, or other techniques.

The computing system 1200 and the machine learning computing system 1300 can each include a communication interface 1230 and 1350, respectively. The communication interfaces 1230/1350 can be used to communicate with one or more systems or devices, including systems or devices that are remotely located from the computing system 1200 and the machine learning computing system 1300. A communication interface 1230/1350 can include any circuits, components, software, etc. for communicating with one or more networks (e.g., 1400). In some implementations, a communication interface 1230/1350 can include, for example, one or more of a communications controller, receiver, transceiver, transmitter, port, conductors, software or hardware for communicating data.

The network(s) 1400 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1400 can be accomplished, for instance, through a network interface using any type of protocol, protection scheme, encoding, format, packaging, etc.

FIG. 11 illustrates one example system 1100 that can be used to implement the present disclosure. Other systems can be used as well. For example, in some implementations, the computing system 1200 can include the model trainer 1340 and the training dataset 1345. In such implementations, the machine-learned models 1335 can be both trained and used locally at the computing system 1200. As another example, in some implementations, the computing system 1200 is not connected to other computing systems.

In addition, components illustrated or discussed as being included in one of the computing systems 1200 or 1300 can instead be included in another of the computing systems 1200 or 1300. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

What is claimed is:

1. A computer-implemented method comprising:
   (a) obtaining data indicative of an object within an environment of an autonomous vehicle;
   (b) determining, using one or more machine-learned models, a plurality of motion goal paths for the object based at least in part on the data indicative of the object within the environment of the autonomous vehicle, wherein a respective motion goal path comprises a plurality of waypoints for the object;
   (c) determining a plurality of acceleration profiles based on the plurality of motion goal paths for the object;
   (d) determining, using a path tracking algorithm, a plurality of predicted motion trajectories of the object based on the plurality of acceleration profiles,
      wherein a respective predicted motion trajectory of the object comprises a spatial-temporal trajectory that comprises a plurality of future predicted positions of the object at a plurality of respective future timesteps;
   (e) determining a motion plan of the autonomous vehicle based on at least one of the predicted motion trajectories of the object, wherein the motion plan is indicative of a motion trajectory of the autonomous vehicle; and
   (f) initiating a motion control of the autonomous vehicle based on the motion plan.

2. The computer-implemented method of claim 1, wherein the data indicative of the object within the environment of the vehicle comprises:
   (i) data indicative of one or more previous positions of the object, and
   (ii) state data indicative of a heading of the object, a current position of the object, a velocity of the object, and an acceleration of the object.

3. The computer-implemented method of claim 1, wherein the one or more machine-learned models comprise a graph neural network, and wherein (b) comprises:
   generating, using the graph neural network, a graph for the object based on the plurality of motion goal paths, wherein the graph is encoded with:
   (i) a plurality of goal nodes associated with the plurality of motion goal paths, and
   (ii) an object node associated with a current state and a past state of the object.

4. The computer-implemented method of claim 3, wherein the one or more machine-learned models comprises one or more convolutional neural networks and a recurrent neural network, wherein the plurality of goal nodes are encoded using the one or more convolutional neural networks and the object node is encoded using the recurrent neural network.

5. The computer-implemented method of claim 1, wherein (c) comprises:
   generating, using one or more machine-learned temporal prediction models, multiple acceleration profiles for each of the plurality of motion goal paths, a respective acceleration profile describing a predicted acceleration of the object along an associated motion goal path.

6. The computer-implemented method of claim 1, further comprising:
   obtaining map information associated with the environment of the autonomous vehicle, and wherein the plurality of motion goal paths comprise: (i) at least one map-based goal that is based on the map information associated with the environment of the autonomous vehicle, and (ii) at least one map-free goal that is based on a heading of the object.

7. The computer-implemented method of claim 1, wherein (d) comprises:
   identifying a motion goal path of the plurality of motion goal paths for the object;
   determining a goal point on the motion goal path and a control point for the object; and determining a curvature of a predicted motion trajectory based on the goal point, the control point for the object, and an object dynamics constraint associated with a possible curvature that is executable by the object.

8. The computer-implemented method of claim 7, wherein (d) further comprises:
updating a state of the object based on at least one of the plurality of acceleration profiles.

9. The computer-implemented method of claim 1, wherein the one or more machine-learned models are trained in an end-to-end manner based on a total loss comprising a mode classification loss and a trajectory error loss.

10. The computer-implemented method of claim 9, wherein:
the mode classification loss corresponds to one or more probabilities determined for the plurality of predicted motion trajectories; and
the trajectory error loss corresponds to one or more distance metrics determined for the plurality of predicted motion trajectories.

11. The computer-implemented method of claim 1, further comprising:
evaluating the predicted motion trajectories based on at least one of:
(i) a lateral speed violation threshold,
(ii) a centripetal acceleration violation threshold, or
(iii) a traversal acceleration violation threshold.

12. An autonomous vehicle control system comprising:
one or more processors; and
one or more computer-readable medium storing instructions that when executed by the one or more processors cause the autonomous vehicle control system to perform operations, the operations comprising:
(a) obtaining data indicative of an object within an environment of an autonomous vehicle;
(b) obtaining map information associated with the environment of the autonomous vehicle;
(c) determining, using one or more machine-learned models, a plurality of motion goal paths for the object based at least in part on the data indicative of the object within the environment of the autonomous vehicle and the map information associated with the environment of the autonomous vehicle;
(d) determining a plurality of acceleration profiles based on the plurality of motion goal paths for the object;
(e) determining, using a path tracking algorithm, a plurality of predicted motion trajectories of the object based on the plurality of acceleration profiles, wherein a respective predicted motion trajectory of the object comprises a spatial-temporal trajectory that comprises a plurality of future predicted positions of the objects at a plurality of respective future timesteps;
(f) determining a motion plan of the autonomous vehicle based on at least one of the predicted motion trajectories of the object, wherein the motion plan is indicative of a motion trajectory of the autonomous vehicle; and
(g) initiating a motion control of the autonomous vehicle based on the motion plan.

13. The autonomous vehicle control system of claim 12, wherein (d) comprises:
generating, using one or more machine-learned temporal prediction models, multiple acceleration profiles for each of the plurality of motion goal paths.

14. The autonomous vehicle control system of claim 12, wherein (c) comprises:
encoding, using the one or more machine-learned models, a graph for the object based on the plurality of motion goal paths.

15. The autonomous vehicle control system of claim 12, wherein (e) comprises:
identifying a motion goal path of the plurality of motion goal paths for the object;
determining a goal point on the motion goal path and a control point for the object; and
determining a curvature of a predicted motion trajectory based on the goal point, the control point for the object, and an object dynamics constraint associated with a possible curvature that is executable by the object.

16. The autonomous vehicle control system of claim 12, further comprising:
determining a motion plan of the autonomous vehicle based on at least one of the predicted motion trajectories of the object, wherein the motion plan is indicative of a motion trajectory of the autonomous vehicle.

17. An autonomous vehicle comprising:
one or more processors; and
one or more computer-readable medium storing instructions that when executed by the one or more processors cause the autonomous vehicle to perform operations, the operations comprising:
(a) obtaining data indicative of an object within an environment of an autonomous vehicle;
(b) determining, using one or more machine-learned models, a plurality of motion goal paths for the object based at least in part on the data indicative of the object within the environment of the autonomous vehicle, wherein a respective motion goal path comprises a plurality of waypoints for the object;
(c) determining a plurality of acceleration profiles based on the plurality of motion goal paths for the object;
(d) determining, using a path tracking algorithm, a plurality of predicted motion trajectories of the object based on the plurality of acceleration profiles, wherein a respective predicted motion trajectory of the object comprises a spatial-temporal trajectory that comprises a plurality of future predicted positions of the object at a plurality of respective future timesteps;
(e) determining a motion plan of the autonomous vehicle based on at least one of the predicted motion trajectories of the object, wherein the motion plan is indicative of a motion trajectory of the autonomous vehicle; and
(f) initiating a motion control of the autonomous vehicle based on the motion plan.

18. The autonomous vehicle of claim 17, wherein the autonomous vehicle comprises one or more sensors configured to collect sensor data associated with the environment of the autonomous vehicle, and wherein the data indicative of the object within the environment of the autonomous vehicle is based on the sensor data.

19. The autonomous vehicle of claim 17, wherein the one or more machine-learned models comprise a graph neural network, and wherein (b) comprises:
generating, using the graph neural network, a graph for the object based on the plurality of motion goal paths, wherein the graph is encoded with: (i) a plurality of goal nodes associated with the plurality of motion goal paths, and (ii) an object node associated with a current state and a past state of the object.

20. The autonomous vehicle of claim 17, the operations further comprising:
   obtaining map information associated with the environment of the autonomous vehicle, and wherein the plurality of motion goal paths comprise:
   (i) at least one map-based goal that is based on the map information associated with the environment of the autonomous vehicle, and
   (ii) at least one map-free goal that is based on a heading of the object.

\* \* \* \* \*

UNITED STATES PATENT AND TRADEMARK OFFICE
CERTIFICATE OF CORRECTION

| | | |
|---|---|---|
| PATENT NO. | : 12,110,042 B1 | Page 1 of 1 |
| APPLICATION NO. | : 17/501480 | |
| DATED | : October 8, 2024 | |
| INVENTOR(S) | : Hoang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this
Twenty-sixth Day of August, 2025

Coke Morgan Stewart
*Acting Director of the United States Patent and Trademark Office*